(12) United States Patent
Hundal et al.

(10) Patent No.: US 7,610,385 B2
(45) Date of Patent: Oct. 27, 2009

(54) SYSTEM AND METHOD FOR ADAPTIVE BANDWIDTH UTILIZATION FOR INTEROPERABILITY

(75) Inventors: Sukhdeep S. Hundal, British Columbia (CA); Supajet Guy Pothiboon, British Columbia (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 727 days.

(21) Appl. No.: 10/338,009

(22) Filed: Jan. 8, 2003

(65) Prior Publication Data

US 2004/0131016 A1    Jul. 8, 2004

(51) Int. Cl.
    *G06F 15/16* (2006.01)
(52) U.S. Cl. .................. 709/227; 709/228; 709/229; 709/233; 455/112; 375/132
(58) Field of Classification Search ............ 709/223, 709/224, 227, 228, 229, 233; 455/112, 130, 455/176.1; 375/132
See application file for complete search history.

(56) References Cited

U.S. PATENT DOCUMENTS

| 5,907,812 | A * | 5/1999 | Van De Berg | ............... | 455/461 |
|---|---|---|---|---|---|
| 6,674,789 | B1 * | 1/2004 | Fardoun et al. | ............. | 375/132 |
| 6,996,779 | B2 * | 2/2006 | Meandzija et al. | .......... | 715/736 |
| 2002/0172162 | A1 * | 11/2002 | Goodings | ................... | 370/280 |
| 2003/0053455 | A1 * | 3/2003 | Kryskow, Jr. | ............... | 370/389 |
| 2004/0001467 | A1 * | 1/2004 | Cromer et al. | .............. | 370/338 |
| 2004/0047324 | A1 * | 3/2004 | Diener | ....................... | 370/338 |

FOREIGN PATENT DOCUMENTS

| EP | 1 220 466 | 7/2002 |
|---|---|---|
| GB | 2 261 141 | 5/1993 |
| GB | 2 268 857 | 1/1994 |
| GB | 2 341 050 | 3/2000 |
| WO | WO/ 02 25832 | 3/2002 |
| WO | WO/ 02 087093 | 10/2002 |

OTHER PUBLICATIONS

GB Seach Report dated May 13, 2004.

* cited by examiner

*Primary Examiner*—Ario Etienne
*Assistant Examiner*—Barbara N Burgess
(74) *Attorney, Agent, or Firm*—Paul, Hastings, Janofsky & Walker LLP

(57) ABSTRACT

Bandwidth usage in a radio communication device is readjusted to eliminate overlapping communication system bandwidth. The readjustment is made in consideration of communication channel quality and other activity in the spectrum in which the radio communications are desired. Using this information, a communication link is set up to avoid overlapping with other radio communications already present in the band. Frequencies at which significant degradation in the communication occurs are also avoided. In addition, for frequency hopping devices, hop sequence is readjusted in accordance with the newly assigned channels.

31 Claims, 5 Drawing Sheets

SYSTEM AND METHOD FOR ADAPTIVE BANDWIDTH UTILIZATION FOR INTEROPERABILITY

BACKGROUND

1. Field of the Invention

Embodiments of the present invention relate generally to reducing the effect of interferers in a radio communication band commonly used in cordless telephone communication. More particularly, embodiments of the present invention relate to an adaptive mechanisms to allocate available bandwidth in the presence of interfering radio signals.

2. Background of the Invention

Cordless telephone products often use the license-free ISM bands for radio communication, such as the 2.4 GHz and 5.8 GHz ISM bands. In addition, numerous other products use these bands for radio communications. Such technologies include for example, 802.11 a/b/e/g, fixed frequency-based systems and wideband systems such as direct sequence spread spectrum systems. The presence of such products leads to interference in communications between the cordless telephone hand piece and its base station. Likewise, cordless telephone communications cause interference with communications occurring in other products operating in these communication bands. This cross-interference often degrades operation in both communication systems.

Cordless telephones can also use frequency hopping techniques for radio communications. Conventional frequency hopping systems use a fixed number of hop channels. The hop channels occupy set areas within the band. Depending on the channel allocation of the systems using the communication band, there may overlap with other systems. Such overlap can cause interference between systems and prevent them from interoperating.

There are a variety of conventional frequency hopping devices including Bluetooth devices, cordless telephones and wireless gaming consoles. Conventional frequency hopping devices have a predefined number of channels and a random hop sequence. The number of channels in the random hop sequence are fixed. Thus, the bandwidth to be used is fixed. Some conventional technologies provide the ability to swap specific channels or drop them from the sequence in the presence of interference. However, the number of useable channels is fixed. The hop sequence is altered only by the number of replacement channels or dropped channels.

Because, the number of channels is fixed, the total usable bandwidth is fixed. As a result, conventional frequency hopping systems cannot adapt to use the free radio frequency (RF) spectrum when it is clear. Moreover, because the bandwidth is fixed, there can be degradation in the frequency hopping system when the free area within the band is less than that for which the hop bandwidth is designed.

BRIEF SUMMARY OF THE INVENTION

Embodiments of the present invention overcome the interoperability problems with cross-interference described above by identifying an interferer, and then modifying operating parameters to avoid the interferer. For example, an embodiment of the present invention identifies the portion of the communication band that is occupied by interferers or that significantly degrades communications. Avoidance of the such portions of the communication band translates to reduced interference, and ultimately to improved performance of systems operating in the same communication band.

In one embodiment of the present invention, frequency hopping sequences are modified to avoid the presence of known interferers. In this manner, embodiments of the present invention overcome the rigidity of conventional frequency hopping systems, thereby overcoming their inherent inability to interoperate with other devices. For example, one embodiment of the present invention adapts to the utilization of other systems within the frequency band. By adapting in this manner interoperability with other systems is improved.

For example, in one embodiment of the present invention, a hop sequence is provided that avoids the portion of the spectrum already used by other systems or portions of the spectrum where significant degradation of communications is occurring. A variety of techniques can be used to determine which portions of the spectrum are occupied or producing significant communication degradation including measurements of bit error rate (BER) and received signal strength indication (RSSI). To avoid such areas in a frequency hopping system, an embodiment of the present invention dynamically readjusts the hop sequence within the free area. To avoid such areas in a fixed frequency system, the present invention dynamically chooses a useable frequency to use within the free area. This maintains robustness of the system and achieves inter-operability with other devices. As a result both bandwidth and hop sequence are dynamically readjusted to maximize usage of the free portion of available bandwidth.

In one embodiment, the present invention is a system for adaptively maximizing bandwidth utilization in a communications band. The system includes an activity sensor to determine frequencies being used by other communication systems using the communication band and a bandwidth utilization profile generator to generate a profile of the communication band. A link manager is included in the system to manage and control the communication link to use available bandwidth in accordance with information provided by the bandwidth utilization profile.

DETAILED DESCRIPTION OF THE INVENTION

Figure 1:
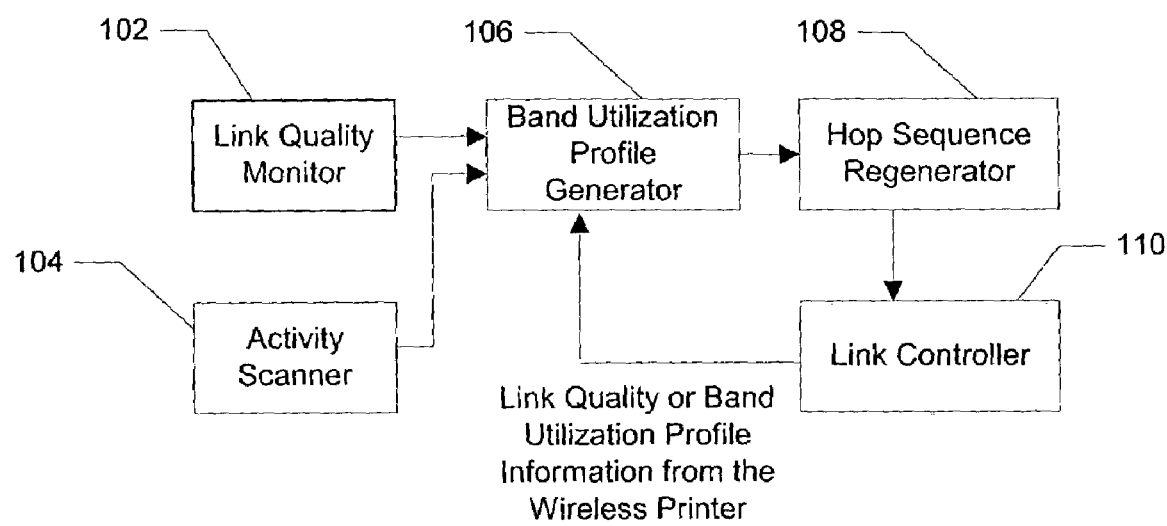
FIG. 1 is a schematic diagram illustrating a system for dynamically determining bandwidth and hop sequence for a device according to an embodiment of the present invention.

FIG. 1 is a schematic diagram illustrating a system for adaptively allocating available bandwidth in a communication band according to an embodiment of the present invention. A link quality monitor 102 provides an estimate of the quality of the current communication channel of the system. Link quality monitor 102 can compare the estimate of the link quality to a predetermined or dynamically adjustable link quality threshold. The dynamically adjustable link quality threshold provides a mechanism for adapting to changing environments.

For example, in one embodiment of the present invention, link quality monitor 102 is a bit-error monitoring engine that provides an estimate of the bit error rate (BER) of the current communication channel of the system. The BER can be used as an indication of whether communication has been significantly degraded. For example, if the BER is greater than a determined BER threshold, communication is defined to be significantly degraded. The BER threshold can be predetermined or dynamically adjusted.

An activity scanner 104 provides information regarding the presence of other activity in the current communication channel of the system. For, example, in one embodiment of the present invention, activity scanner 104 is a logic engine that uses RSSI information to detect and identify interferers in the communication band. An exemplary activity scanner is described in co-pending U.S. patent application Ser. No. 10/338,011, filed on Jan. 8, 2003, which is hereby incorporated by reference herein in its entirety.

A band utilization profile generator 106 uses the outputs provided by link quality monitor 102 and activity scanner 104 to generate a utilization profile within the communication band of interest, for example, the 2.4 GHz ISM band. For example, in one embodiment of the present invention, the profile is a histogram illustrating the activity in the channels in the band. In addition, the band utilization profile can show channels having BERs that indicate significant communication degradation.

Band utilization profile generator 106 also processes the information it receives to determine whether the bit error rate determined by link quality monitor 102 is caused by another frequency hopper or by a fixed-frequency interference. For example, in one embodiment of the present invention, whether the interferer is frequency hopping or fixed-frequency is determined by tracking the error occurrence and the periodicity associated with the error. Band utilization profile generator 106 can use information received from a link controller (described below) on the other side of a communication link to assist in this determination. The profile generated by band utilization profile generator provides a spectral map of available spectrum in the communication band (i.e., the portion of the communication channel that is free from interferers and/or that does not significantly degrade communications).

A hop sequence generator 108 generates a pseudo-random hop-sequence to comply with FCC regulations The generated pseudo-random hop sequence is passed onto a link controller unit 110.

Link controller 110 manages link quality, throughput and synchronization of the communication link by generating and controlling hop sequence frequencies and other related functions. In one embodiment of the present invention, for example, link controller 110 is a software module that controls link behavior. Link controller 110 determines what frequencies are to be used in the hop sequence. In one embodiment of the present invention, for example, link controller 110 uses the profile generated by band utilization profile generator 106 and the pseudo-random hop sequence generated by hop sequence generator 108 to generate a modified hop sequence that avoids known interferers to the extent possible.

For example, in one embodiment of the present invention, link controller 110 determines which frequencies to use and which frequencies to avoid. To make these decisions, link controller receives the profile determined by band utilization profile generator 106. Link controller 110 discards frequencies on which interferers are present from the hopping sequence.

In addition, link controller 110 can use BER information generated by link quality monitor 102. BER information helps link controller 110 gauge the effect of an interferer. For example, an interferer may be present on a channel, but not affecting communication quality such that the interferer need be avoided, i.e., the measured BER for the channel is below a predetermined threshold. In such a case, link controller 10 can retain the frequency in the hopping sequence, rather than discard it despite the presence of the interferer because of the negligible effect of the interferer.

For example, link controller 10 can use the profile generated by bandwidth utilization profile generator 106 to generate a hopping sequence. In determining the hop sequence, link controller 110 avoids frequencies that the profile indicates are being used. For example, if the profile indicates that an 802.11b signal is present in channel 1, link controller 110 generates the hop sequence to avoid channel 1 of 802.11b. Link controller 110 outputs a new channel plan or a new hop sequence that avoids identified interferers. Thus, the hopping sequence can be generated and then overlapping frequencies can be discarded.

Link controller 110 can also provide information to the other side of a communication link to assist a band utilization profile generator on the other side of the communication link in determining whether an interferer is frequency hopping or fixed-frequency. Link controller unit 110 can communicate to the other link controller of the communication pair (but can apply also to a multi-party communication configuration) via special encoded messages/header or via a special logical channel.

Figure 2:
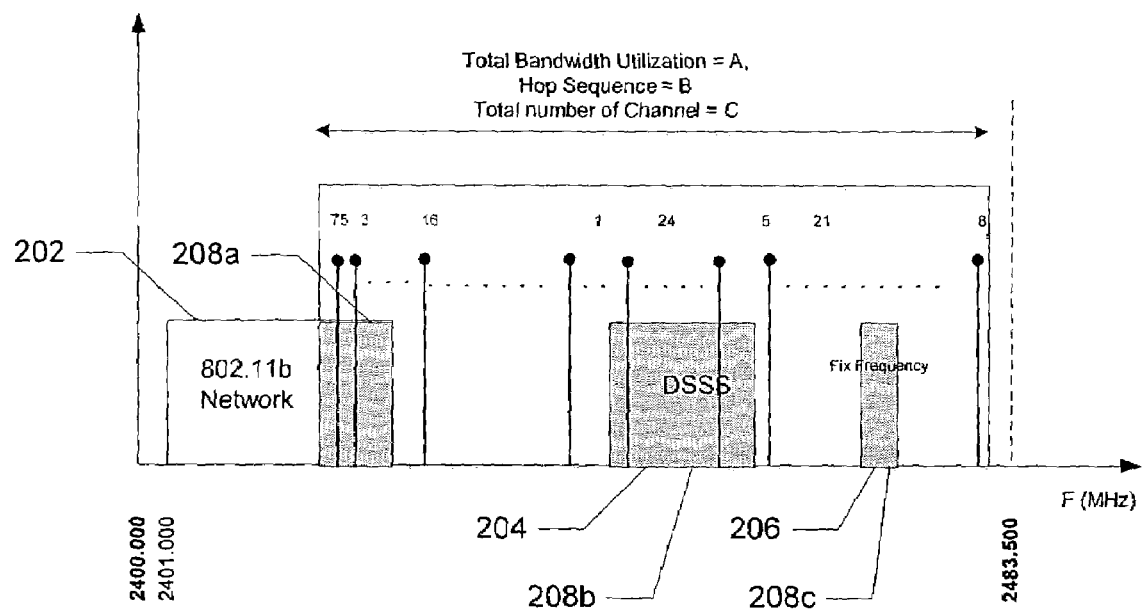
FIG. 2 is an exemplary spectrum of a communication environment illustrating overlapping communication spectra.
Figure 3:
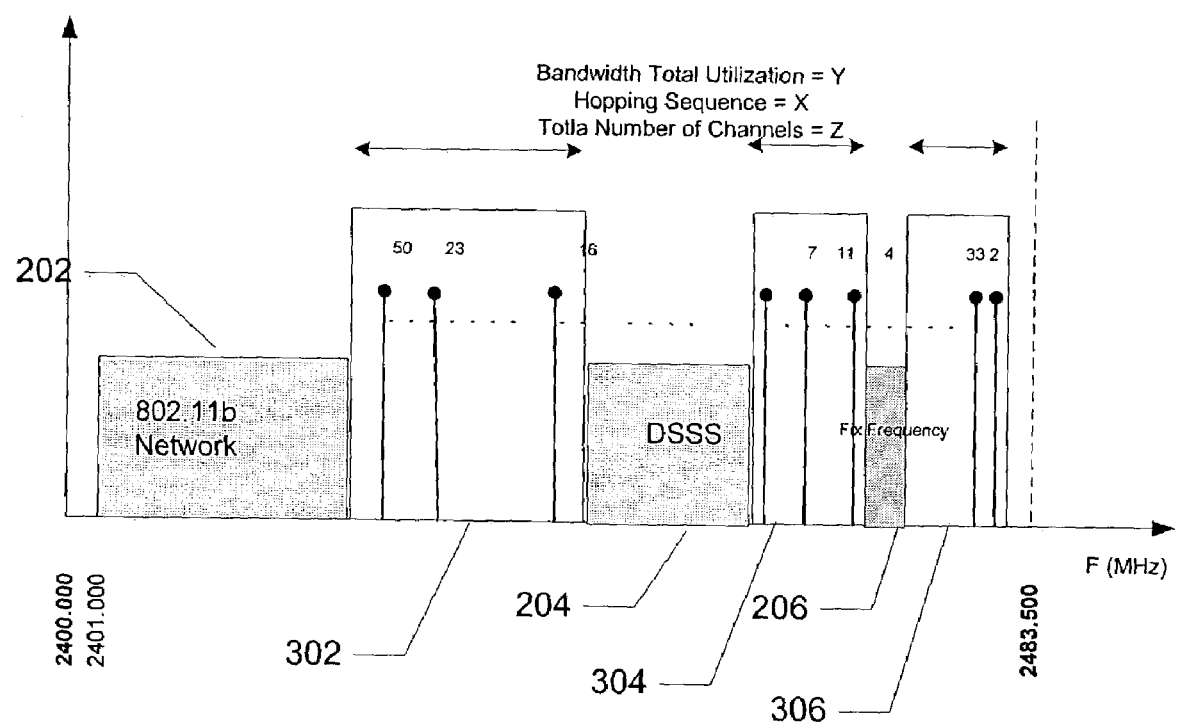
FIG. 3 is an exemplary spectrum of a communication environment after bandwidth reallocation and frequency hopping readjustment according to an embodiment of the present invention.

FIGS. 2 and 3 illustrate a bandwidth usage and readjustment according to an embodiment of the present invention. FIG. 2 illustrates and exemplary band utilization profile for an exemplary 2.4 GHz spectrum that can be generated by band utilization profile generator 106. Three interferences 202, 204 and 206 are present in the exemplary spectrum. Interference 202 is an 802.11b communication network in channel 1 of the spectrum. Interference 204 is a direct sequence spread spectrum (DSSS) signal. Interference 206 is a fixed-carrier signal. In the present example, interferences 202 and 204 are wideband, and interference 206 is narrowband.

A communication system, for example, a cordless telephone, that has a hop sequence as shown by the numeric sequence above the vertical lines is also present in the exemplary spectrum. As can be seen, three areas of spectral overlap are illustrated 208a, 208b and 208c. Overlap area 208a is a region where the cordless telephone communications overlap with 802.11b interference 202. Overlap area 208b is a region where the cordless telephone communications overlap with DSSS interference 204. Overlap area 208a is a region where the cordless telephone communications overlap with fixed-carrier interference 206. The overlapping areas indicate that there will likely be degradation to the cordless telephone communications as well as to the 802.11b communications, the DSSS communications and the fixed-carrier communications.

FIG. 3 illustrates an exemplary bandwidth profile after readjustment by a system according to an embodiment of the present invention. In this example, the system readjusts bandwidth used by the cordless telephone so that there is no overlap with interferences 202, 204 and 206. The readjusted regions correspond to spectral regions 302, 304 and 306. In addition, the hopping sequence is readjusted as shown by the new numbering above the vertical lines in FIG. 3.

In the foregoing example, the number of channels and, consequently, the bandwidth used by the communication link was reduced to maximize usage of the free bandwidth. In other cases, an embodiment of the present invention can increase bandwidth by, for example, increasing the number of channels used by the communication link. In this case, the embodiment of the present invention detected that additional bandwidth was available to be used by the communication link. Hopping sequence readjustment is also performed to accommodate the added channels.

Embodiments of the present invention readjust bandwidth used by a device to maximize use of available bandwidth without overlap. Guard bands can be allocated to further avoid overlapping communications. Other criteria that can be considered in allocating bandwidth include BER, signal strength and interferer identification.

Moreover, embodiments of the present invention account for the dynamic nature of interferers by dynamically reallocating available spectrum. In one embodiment, dynamic reallocation as described above is performed on a repetitious basis. The repetitive nature can be periodic, scheduled at predetermined times or randomized.

The frequency allocation technique of the present invention can be applied to systems other than frequency hopping systems. That is, the present invention can be applied to any communication system that desires to minimize the impact of overlapping interferer signals. For example, in other systems, the carrier frequency can be chosen by link controller 110 to avoid the spectrum covered by identified interferers based on interferer identity and BER.

Figure 4:
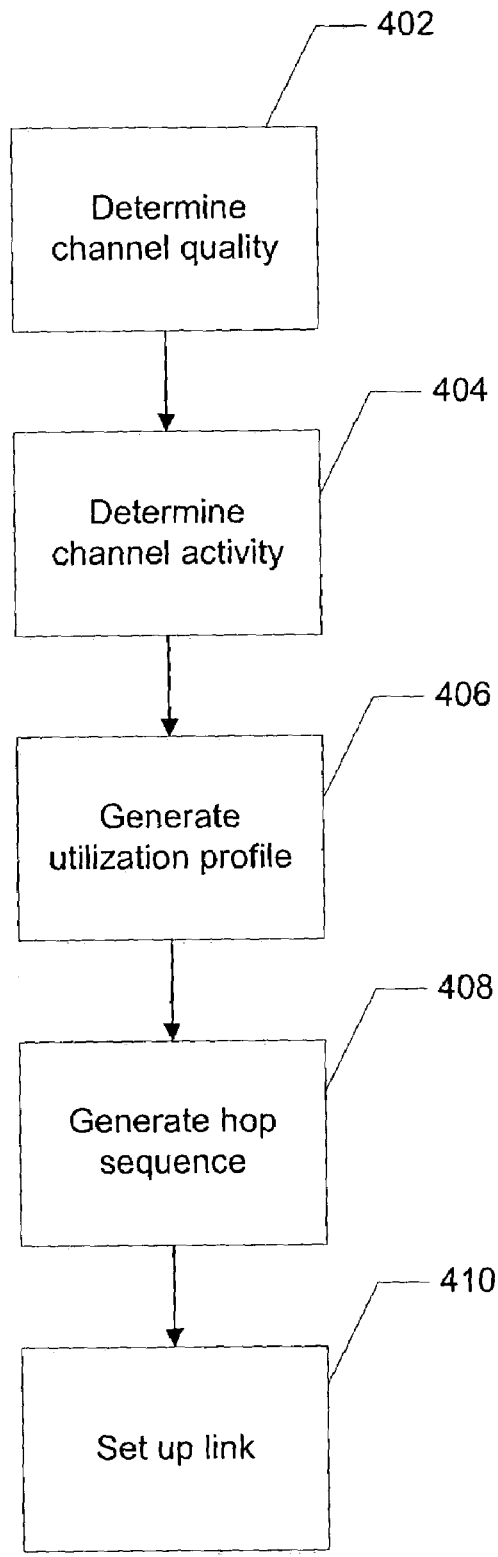
FIG. 4 is a flow chart for a method for adaptive bandwidth utilization in a communication channel according to an embodiment of the present invention.

FIG. 4 is a flow chart for a method for adaptive bandwidth utilization in a communication channel according to an embodiment of the present invention. The method can be performed in a cordless telephone handset or base unit. In step 402, channel quality is determined. In one embodiment of the present invention, BER for the channel is determined as a measure of the channel quality. In step 404, channel activity is determined. For example, channel activity can be determined as described in co-pending U.S. patent application Ser. No. 10/338,011, filed on Jan. 8, 2003, which is hereby incorporated by reference in its entirety.

In step 406 a band utilization profile is generated. The band utilization profile uses information generated in steps 402 and 406 to generate a profile of band utilization. For example, in one embodiment of the present invention, the band utilization profile is a histogram illustrating the activity of the channels in the band. In addition, the band utilization profile can show channels having BERs that indicate significant communication degradation.

In step 408, a pseudo-random hop sequence is generated. Step 408 is optional in that it is only required for frequency hopping embodiments of the present invention.

In step 410, a communication link is set up by selecting frequencies for establishing communications that avoid interferers in the communication band. In addition, frequencies where communication is significantly degrade are avoided. In frequency hopping systems, frequencies are used according to the randomly generated hopping sequence.

Figure 5:
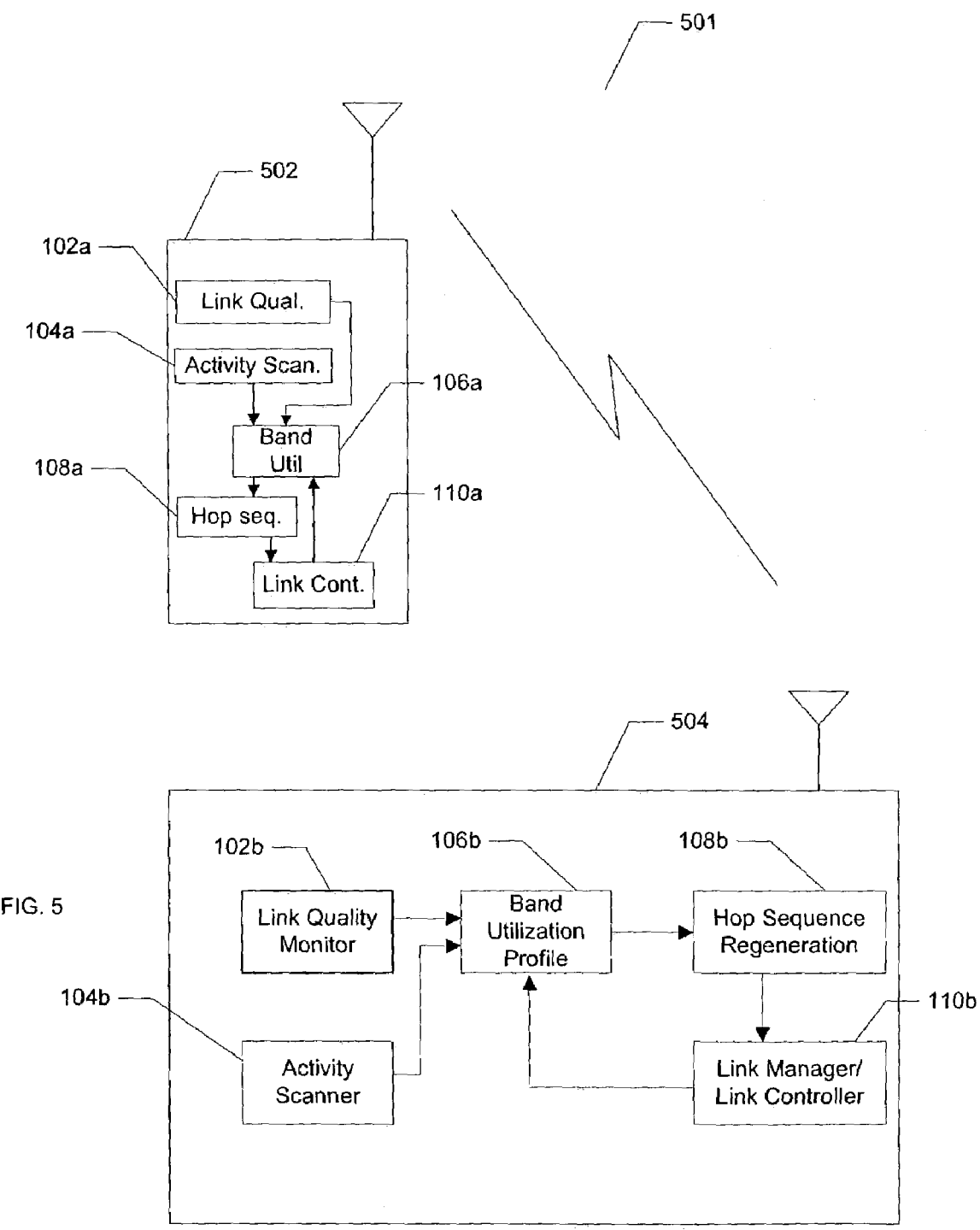
FIG. 5 is a schematic diagram of a system for adaptively maximizing use of available bandwidth in a cordless telephone communication system.

FIG. 5 is a schematic diagram of a system 501 for adaptively maximizing use of available bandwidth in a cordless telephone communication system. A cordless telephone handset 502 is in communication with a cordless telephone base unit 504. Cordless telephone handset 502 includes a link quality monitor 102a, an activity scanner 104a, a band utilization profile generator 106a, a hop sequence regenerator 108a and a link controller 110a. Link quality monitor 102a is similar in function to link quality monitor 102 described above. Activity scanner 104a is similar in function to activity scanner 104 described above. Band utilization profile generator 106a is similar in function to band utilization profile generator 106 described above. Hop sequence regenerator 108a is similar in function to hop sequence regenerator 108 described above. Link controller 110a is similar in function to link controller 110 described above.

Cordless telephone bas unit 504 includes a link quality monitor 102b, an activity scanner 104b, a band utilization profile generator 106b, a hop sequence regenerator 108b and a link controller 10b. Link quality monitor 102b is similar in function to link quality monitor 102 described above. Activity scanner 104b is similar in function to activity scanner 104 described above. Band utilization profile generator 106b is similar in function to band utilization profile generator 106 described above. Hop sequence regenerator 108b is similar in function to hop sequence regenerator 108 described above. Link controller 110b is similar in function to link controller 110 described above.

As described above link controllers 110a and 110b can communicate with one another to determine link characteristics that that can be used to set up communication between cordless telephone handset 502 and cordless telephone base unit 504. For example, in one embodiment of the present invention, link controllers 110a and 110b communicate to determine whether an interferer is a frequency hopper or is of fixed frequency.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for adaptively maximizing bandwidth utilization in a cordless telephone system operating over a predetermined communication band, comprising:

an activity sensor to determine frequencies being used by other communication systems using a the predetermined communication band;

a link monitor to monitor a quality of a communication link by measuring one or more channels in the predetermined communications band;

a bandwidth utilization profile generator to generate a profile of the predetermined communication band; and a link manager, implemented by the cordless telephone system, to manage and control the communication link to preclude use of a given frequency of the predetermined communication band when said given frequency is being used by at least one of said other communication systems in accordance with information provided by the bandwidth utilization profile, wherein the link manager uses the quality of the communication link to determine said given frequency is being used by at least one of said other communication systems, wherein the bandwidth utilization profile generator is configured to receive information from a second link manager on an opposite side of the communication link in order to determine whether errors determined by the link monitor are due to a frequency hopping interferer or fixed frequency interferer, wherein a frequency of interference from the frequency hopping interferer varies in time according to a hop sequence and wherein a frequency of interference from the fixed frequency interferer is constant;

a hop sequence regenerator to generate a pseudo-random hop sequence according to the bandwidth utilization information provided by the bandwidth utilization profile generator, wherein the link manager precludes use of the said given frequency being used by at least one of said other communication systems in accordance with the pseudo-random hop sequence.

2. The system recited in claim 1, wherein the link manager determines said given frequency of the predetermined communication band using information from the activity sensor that identifies interferers.

3. The system recited in claim 1, wherein the quality of the communication link is bit error rate.

4. The system recited in claim 1, further comprising a dynamically adjustable link quality threshold to which the quality of the communication link is compared.

5. The system recited in claim 4, wherein the link manager determines said given frequency being used by at least one of said other communication systems periodically.

6. The system recited in claim 1, further comprising a predetermined link quality threshold to which the quality of the communication link is compared.

7. The system recited in claim 1, wherein the link manager determines said given frequency being used by at least one of said other communication systems dynamically.

8. The system recited in claim 7, wherein the link manager determines said given frequency being used by at least one of said other communication systems according to a predetermined schedule.

9. The system recited in claim 7, wherein the link manager determines said given frequency being used by at least one of said other communication systems on a random basis.

10. A method for adaptively maximizing bandwidth utilization in a cordless telephone system, comprising:

determining frequencies being used by other communication systems using a predetermined communication band;

monitoring, using a link monitor, a quality of a communication link to determine available frequencies not being used by at least one of said other communication systems;

generating, using a bandwidth utilization profile generator, a bandwidth utilization profile of the predetermined communication band; and using a link manager, implemented by the cordless telephone system, to control the communication link to determine available frequencies not being used by at least one of said other communication systems in accordance with information provided by the bandwidth utilization profile, wherein the bandwidth utilization profile generator is configured to receive information from a second link manager on an opposite side of the communication link in order to determine whether errors determined by the link monitor are due to a frequency hopping interferer or fixed frequency interferer, wherein a frequency of interference from the frequency hopping interferer varies in time according to a hop sequence and wherein a frequency of interference from the fixed frequency interferer is constant;

generating a pseudo-random hop sequence according to the bandwidth utilization profile; and controlling the communication in accordance with the generated pseudo-random hop sequence.

11. The method recited in claim 10, further comprising: identifying interferers in the predetermined communication band; and using the identifications to determine the available frequencies not being used by at least one of said other communication systems.

12. The method recited in claim 10, further comprising: monitoring a link quality; and comparing the link quality to a link quality threshold to determine available frequencies not being used by at least one of said other communication systems.

13. The method recited in claim 12, further comprising predetermining the link quality threshold.

14. The method recited in claim 13, wherein the link quality is bit error rate.

15. The method recited in claim 12, further comprising dynamically adjusting the link quality threshold.

16. The method recited in claim 15, wherein the link quality is bit error rate.

17. The method recited in claim 10, further comprising determining available frequencies not being used by at least one of said other communication systems dynamically.

18. The method recited in claim 17, further comprising determining available frequencies not being used by at least one of said other communication systems periodically.

19. The method recited in claim 17, further comprising determining available frequencies not being used by at least one of said other communication systems according to a predetermined schedule.

20. The method recited in claim 17, further comprising determining available frequencies not being used by at least one of said other communication systems on a random basis.

21. A system for adaptively maximizing bandwidth utilization in a cordless telephone system, comprising:

means for determining frequencies being used by other communication systems using a predetermined communication band;

means for monitoring a quality of a communication link to determine available frequencies not being used by at least one of said other communication systems;

means for generating a bandwidth utilization profile of the predetermined communication band; and means for controlling communication to determine available frequencies not being used by at least one of said other communication systems in accordance with information provided by the bandwidth utilization profile, wherein the means for generating a bandwidth utilization profile is configured to receive information from a second means for controlling communication disposed on an opposite side of the communication link in order to determine whether errors determined by the means for monitoring are due to a frequency hopping interferer or fixed frequency interferer, wherein a frequency of interference from the frequency hopping interferer varies in time according to a hop sequence and wherein a frequency of interference from the fixed frequency interferer is constant;

means for generating a pseudo-random hop sequence according to the bandwidth utilization profile; and means for controlling the communication in accordance with the generated pseudo-random hop sequence.

22. The system recited in claim 21, further comprising: means for identifying interferers in the predetermined communication band; and means for using the identifications to determine the available frequencies not being used by at least one of said other communication systems.

23. The system recited in claim 21, further comprising: means for monitoring a link quality; and means for comparing the link quality to a link quality threshold to determine available frequencies not being used by at least one of said other communication systems.

24. The system recited in claim 23, further comprising means for predetermining the link quality threshold.

25. The system recited in claim 24, wherein the link quality is bit error rate.

26. The system recited in claim 23, further comprising means for dynamically adjusting the link quality threshold.

27. The system recited in claim 26, wherein the link quality is bit error rate.

28. The system recited in claim 21, further comprising means for determining available frequencies not being used by at least one of said other communication systems dynamically.

29. The system recited in claim 28, further comprising means for determining available frequencies not being used by at least one of said other communication systems periodically.

30. The system recited in claim 28, further comprising means for determining available frequencies not being used by at least one of said other communication systems according to a predetermined schedule.

31. The system recited in claim 28, further comprising means for determining available frequencies not being used by at least said one of said other communication systems on a random basis.

* * * * *